3,189,649
2,6-DICHLOROBENZAMIDINES
Herbert P. Rosinger, Tunstall, and Johannes T. Hackmann, Herne Bay, England, assignors to Shell Oil Company, New York, N.Y., a corporation of Delaware
No Drawing. Filed Dec. 19, 1962, Ser. No. 245,668
Claims priority, application Great Britain, Dec. 22, 1961, 45,980/61
5 Claims. (Cl. 260—564)

This invention relates to novel 2,6-dihalobenzamidines, a process for their manufacture, and their use. 2,6-dihalobenzamidines exhibit marked herbicidal properties, and are particularly toxic to germinating seeds. 2,6-dihalobenzamidines also have useful pharmacological properties. The invention therefore also relates to compositions comprising 2,6-dihalobenzamidines for use in agriculture for combatting weeds, and to the treatment of areas bearing or intended to bear crops with said compounds or compositions, containing them, to control weeds, and to the use of 2,6-dihalobenzamidines for pharmacological purposes.

The novel compounds of the invention are 2,6-dihalobenzamidines of the general formula:

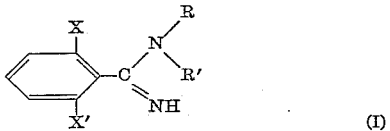

(I)

wherein X and X' each independently represents a halogen atom, preferably a middle halogen atom—that is, bromine or chlorine—and R and R' each independently represents a member of the group consisting of hydrogen and lower hydrocarbon radicals, and their salts.

Preferred compounds of this class are those wherein X and X' each is chlorine, with the members of this particular subclass wherein R and R' each is hydrogen being of particular interest because of their high herbicidal activity.

R and/or R' can represent lower hydrocarbon radicals, a lower hydrocarbon radical being one containing only carbon and hydrogen and containing not more than about 10 carbon atoms. The hydrocarbon radicals represented by either or both of these symbols suitably can be of straight-chain, branched-chain or cyclic configuration, and can be aliphatic (by which is meant to include cycloaliphatic) in character, or may be aromatic in character, or may be of mixed character. Where of aliphatic character, they may be olefinically unsaturated, but preferably are free from acetylenic unsaturation. In terms of type, they thus may be straight-chain or branched-chain aliphatic, such as alkyl, alkenyl, or the like; they may be cycloaliphatic, such as cycloalkyl, cycloalkenyl, or the like (for example, cyclopentyl, cyclohexyl, methylcyclohexyl, dimethylcyclooctyl, 3,5,5-trimethylcyclohexyl, cyclohexenyl, cyclopentenyl, and the like); they may be aromatic, such as phenyl, naphthyl or the like; they may be mixed, such as alkaryl (alkyl-substituted phenyl, for example), alkenyl-substituted aryl (as for example, allylphenyl), aralkyl (such as benzyl, phenethyl, p-methylbenzyl, alpha-methylbenzyl, or the like), aralkenyl (as in beta-phenylvinyl, or the like). Preferably, the aliphatic hydrocarbon radicals are saturated, and the aromatic radicals (by which is meant araliphatic as well as aliphatic-substituted aryl) contain only aromatic unsaturation. The preferred aliphatic radicals are the alkyl radicals of from 1 to 4 carbon atoms. The preferred aromatic radicals are the phenyl radical, alkyl-substituted phenyl radicals, phenyl-substituted alkyl radicals and alkyl-substituted-phenyl-substituted alkyl radicals; in these aralkyl radicals, the phenyl moiety being bonded by a linking carbon atom to the indicated nitrogen atom. Typically suitable hydrocarbon groups represented by R and/or R' include: methyl, ethyl, n- and isopropyl, n-, sec- and tert-butyl, the various isomeric pentyl, hexyl and like alkyl groups; the phenyl group; the naphthyl group; the benzyl, phenethyl, p-methylbenzyl and like aralkyl groups; the isomeric tolyl and xylyl groups, the ethylphenyl groups, the 2,4-dimethylphenyl groups, and like alkaryl groups, and the like.

The suitable salts of such compounds are those of inorganic acids, for example the hydrochlorides, hydrobromides, nitrates, sulfates or phosphates, and the salts of organic acids, for example, of lower carboxylic acids such as the formates, the acetates, salts of alkanesulfonic acids, salts of benzenesulfonic acids, such as isethionic acid or benzenesulfonic acid, or of picric acid.

The present invention provides a process for preparing compounds of the above general formula in which R and R' each represent a hydrogen atom, which comprises treating the corresponding 2,6-dihalobenzamidoxime with carbon disulphide at an elevated temperature and treating the resulting reaction product with an aqueous acid.

The amidoxime is preferably used dissolved in a polar solvent, for example, an aliphatic alcohol of 1 to 3 carbon atoms, particularly methyl alcohol.

A small proportion of water may be added to the reaction mixture, just sufficient to cause the mixture to separate into two layers. The carbon disulphide is suitably used in large excess, for example, at least 5 molecular proportions and preferably at least 10 molecular proportions thereof, based on the amidoxime.

The reaction is suitably effected by heating the mixture gently for about 2 to 4 hours under a reflux condenser. It may, however, be carried out under superatmospheric pressure, for example in an autoclave. When this stage of the process is complete, any carbon disulphide, solvent and volatile material is removed by distillation, eventually under reduced pressure. The residue is then treated with an aqueous acid, preferably hydrochloric acid. This treatment results in a vigorous evolution of hydrogen sulfide and formation of the desired amidine.

The amidines prepared in this way are obtained as salts of the acid used to free the amidine. The free base can be liberated by treating the salt with an alkali, preferably aqueous or alcoholic alkali metal hydroxide or with an alkali alkoxide, followed if desired by recrystallization from a solvent, for example an aromatic hydrocarbon solvent such as benzene, or a mixture thereof with an aliphatic or cycloaliphatic hydrocarbon solvent such as hexane.

Compounds of the above general formula in which R or R' or R and R' each represent a hydrocarbon group can be prepared by treating the 2,6-dihalobenzonitrile with a primary or secondary amine $RNH_2$ or $RR'NH$ in presence of a reaction promoter, preferably a Friedel-Crafts type catalyst such as aluminum chloride. Anhydrous zinc chloride or a boron halide may also be used. The reaction may be effected in absence of a solvent, but an inert solvent such as benzene or other aromatic hydrocarbon solvent may be used if desired. The reaction is carried out under anhydrous conditions. Suitably, the amine and nitrile are mixed in equimolecular proportions and an equimolecular proportion of anhydrous aluminum chloride is gradually added. The reaction is strongly exothermic. After about 30 minutes, the hot reaction mixture is poured into dilute acid. After filtering, the filtrate is treated with excess aqueous sodium hydroxide, sufficient to dissolve the aluminium hydroxide first precipitated. The amidine is then collected by filtration and, if desired, recrystallized from a solvent as indicated above.

The following examples illustrate the preparation of the novel compounds of the invention. In these examples parts by weight (w.) bear the same relationship to parts by volume (v.) as does the kilogram to the liter.

*Example I.—Preparation of 2,6-dichloro-benzamidine hydrochloride*

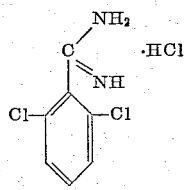

2,6-dichlorobenzamidoxime 205 (w.) was dissolved in 100 v. of methanol and 760 w. of carbon disulphide was added followed by an amount of distilled water just sufficient to cause separation into two layers. The reaction mixture was gently heated under reflux for 3 hours and then allowed to stand for 2 days. The solvents were removed under vacuum and the residue treated with 200 v. of concentrated hydrochloric acid which caused vigorous gas evolution. Distilled water (1000 v.) was added and the residue was extracted with this boiling acid solution. After filtration to remove any sulphur the hydrochloric acid solution was concentrated and on cooling the 2,6-dichlorobenzamidine hydrochloride separated in colorless crystals which, recrystallized from dilute hydrochloric acid, melted at 337° C. with decomposition.

*Analysis.*—Found: N, 12.8%; Cl, 47.5%. $C_7H_7Cl_3N_2$ requires: N, 12.4%; Cl, 47.3%.

*Example II.—Preparation of 2,6-dichlorobenzamidine*

2,6-dichlorobenzamidine hydrochloride (3 w.) was dissolved in alcohol and neutralized with the calculated quantity of sodium methoxide in methanol. The sodium chloride was filtered off and the methanol distilled to dryness. The 2,6-dichlorobenzamidine was recrystallized from a benzene-hexane mixture to give colorless crystals, melting at 116° to 118° C.

*Analysis.*—Found: C, 44.5%; H, 3.4%; Cl, 37.8%, N, 15.1%. $C_7H_6Cl_2N_2$ requires: C, 44.4%; H, 3.2%; Cl, 37.6%, N, 14.8%.

*Example III.—Preparation of N-phenyl-2,6-dichlorobenzamidine*

Aniline (31 w.) was mixed with 570 w. of 2,6-dichlorobenzonitrile and 45 w. of freshly powdered aluminium chloride (anhydrous) was added during 20 minutes in small portions. The reaction was strongly exothermic during the addition of the aluminium chloride and the temperature rose rapidly to 180° to 200° C. It was kept at 200° C. for 30 minutes and then poured while still hot into 800 v. of dilute hydrochloric acid. After filtration the filtrate was poured into a solution of 110 w. of sodium hydroxide in 600 v. ice water. The product was collected by filtration and recrystallized twice from benzene. It gave nearly colorless crystals in 60% yield, melting at 118° C.

*Analysis.*—Found: C, 59.0%; H, 3.3%; N, 10.9%; Cl, 26.9%. $C_{13}H_{11}Cl_2N_2$ requires: C, 59.0%; H, 3.7%; N, 10.6%; Cl, 26.8%.

*Example IV.—Preparation of N-phenyl-2,6-dichlorobenzamidine hydrochloride*

The N-phenyl-2,6-dichlorobenzamidine hydroihloride was prepared by the treatment of N-phenyl-2,6-dichlorobenzamidine in ethereal solution with dry hydrogen chloride. The product was filtered off and redissolved in the minimum of alcohol and reprecipitated with ether to give a nearly colorless powder, melting at 210° C.

*Analysis.*—Found: Cl, 12.2%. $C_{13}H_{12}Cl_3N_2$ requires: Cl, 11.8%.

Herbicidal activity is exhibited by compounds of general Formula I in which R and R' are each hydrogen. The results of herbicidal tests carried out with two of the active compounds of the invention are summarized in the following table. The tests were carried out as follows:

Aqueous compositions containing acetone (40 v.), water (60 v.), Triton X155 (0.5% v.) and the benzamidine in logarithmically varying concentrations were used. In soil spray and soil drench tests, imbibed seeds of oats (O) and mustard (M), and seedling plants of oats, mustard and linseed (O, M, L) respectively, in sterile No. 1 John Innes compost, were sprayed at 50 gallons per acre or drenched at 1000 gallons per acre. In the foliage test, similar plants of oats, mustard and linseed were sprayed with a volume equivalent to 50 gallons per acre. Control tests in which seeds or plants were sprayed and/or drenched with the aqeous acetone—Triton X155 solution only were also carried out. The phytotoxic effect of the benzamidines applied was assessed by determining the reduction from the control in fresh weight of stem and leaf of the test plants and a regression curve relating growth inhibition and dosage plotted. The dosage of the benzamidine required for 50% (G.I.D. 50) inhibition of foliage growth is given in the table. Dosages greater than 10 pounds per acre are indicated by X. It can be seen from the table that the benzamidines are much more toxic most effectively against the seeds and roots of plants.

| Compound | 50% Growth Inhibition Dose, lb./acre ||||||||||||||||||||
|---|---|---|---|---|---|---|---|---|---|---|---|---|---|---|---|---|---|---|---|---|
| | Seeds—Pre-emergence ||||||| Plants—Post-emergence |||||||||||||
| | Soil Spray ||||||| Foliar Spray ||||||| Soil Drench ||||||
| | O | RG | SC | P | SB | L | M | O | RG | SC | P | SB | L | M | O | RG | SC | P | SB | L | M |
| 2,6-dichlorobenzamidine | 1.9 | 1.9 | X | 7.1 | 3.1 | 3.4 | 7.8 | X | X | X | X | X | X | X | X | X | X | X | X | X | X |
| 2,6-dichlorobenzamidine hydrochloride | 1.7 | 1.0 | X | 6.5 | 1.0 | 3.2 | 3.0 | 7.6 | 8.2 | X | X | 4.2 | X | X | 2.6 | 2.8 | 4.5 | X | X | X | 7.1 |

Abbreviations: O=oats, RG=rye grass, SC=sweet corn, P=peas, SB=sugarbeet, L=linseed, M=mustard, X=G.I.D. 50 greater than 10 lb./acre.

This invention relates further to herbicidal compositions comprising an alpha-substituted benzaldoxime as hereinbefore specified and a carrier or a surface active agent or a carrier and a surface active agent.

The term "carrier" as used herein means a material, which may be inorganic or organic and synthetic or of natural origin, with which the active substance is mixed or formulated to facilitate its storage, transport and handling and its application to the plant, seed, soil or other object to be treated. The carrier is preferably biologically and chemically inert. It may be a solid or a fluid. Solid carriers are preferably particulate, granular or pelleted though other shapes and sizes are not thereby excluded. Solid carriers, generally obtainable in particulate, granular or pelleted form, may be naturally occurring minerals, though they may have been subjected to grinding, sieving, purification and other treatments, for example, gypsum, tripolite, diatomite, mineral silicates such as mica, vermiculite, talc and pyrophylite and clays of the montmorillonite, kaolinite or attapulgite groups, calcium or magnesium limes or calcite and dolomite. Carriers produced synthetically, for example, synthetic hydrated silicon oxides and synthetic calcium silicates may also be used and many proprietary products of this type are available commercially. The carrier may also be an elemental substance such as sulfur or carbon, preferably an activated carbon. If the carrier possesses intrinsic catalytic acidity such as it would decompose the toxicant it is advantageous to incorporate a stabilizing agent, for example, urea or hexamethylene tetramine, to neutralize this acidity and so prevent possible decomposition of the benzaldoxime.

For some purposes, a resinous or waxy carrier may be used, preferably one which is solvent soluble or thermoplastic, including fusible. Examples of such carriers are natural or synthetic resins such as a coumarone resin, rosin, copal, shellac, dammar, polyvinyl chloride, styrene, polymers and copolymers, a solid grade of polychlorophenol such as is available under the registered trademark "Aroclor," a bitumen, an asphaltite, a wax, for example, beeswax or a mineral wax such as paraffin wax on Montan wax, or a chlorinated mineral wax. Compositions comprising such resinous or waxy carriers are preferably in granular or pelleted form.

Fluid carriers may be liquids, for example, water or an organic fluid including a liquefied normally vaporous or gaseous material, or a vaporous or gaseous material, and may be solvents or non-solvents for the active material. Horticultural petroleum spray oils boiling in the range 275° to 575° F. or boiling in the range of 575° to 1000° F. and having an unsulphonatable residue of at least 75% and preferably of at least 90%, or a mixture of these two types of oil are particularly suitable liquid carriers.

The carrier may also be a simple or compound fertilizer which may be a solid, preferably granular or pelleted, or a liquid, for example an aqueous solution.

The carrier may be mixed or formulated with the active material during its manufacture or at any stage subsequently. The carrier may be mixed or formulated with the active material in any proportion. One or more carriers may be used.

The compositions of the invention may be concentrates, suitable for storage or transport and containing, for example, from 10 to 95% by weight of the benzamidine. These can be diluted with the same or a different carrier to a concentration suitable for application. The compositions of the invention may also be dilute compositions suitable for application. In general, concentrations of 0.01 to 0.5% by weight, of active material based on the total weight of the composition are satisfactory, though lower and higher concentrations can be applied if necessary. Effective weed control is obtainable by applying the compositions at the rate of 1 to 20 pounds per acre of a herbicidally active benzamidine.

The compositions of the invention may be formulated as dusts. These comprise an intimate mixture of the benzamidine and a finely powdered solid carrier such as is indicated above. These powder carriers may be oil-treated to improve adhesion to the surface to which they are applied. These dusts may be concentrates, in which case a highly sorptive carrier is preferably used. These require to be diluted with same or a different finely powdered carrier, which may be of lower sorptive capacity, to a concentration suitable for application.

The compositions of the invention may be formulated as wettable powders comprising a major proportion of the benzamidine mixed with a dispersing, i.e. deflocculating or suspending, agent and, if desired, a finely divided solid carrier. The benzamidine may be in particulate form or adsorbed on the carrier and preferably constituted at least 10%, more preferably at least 50% by weight of the composition. The concentration of the dispersing agent should in general be between 0.1 and 10% by weight of the total composition though larger or smaller amounts may be used if desired.

The dispersing agent used in the composition of the invention may be any substance having definite dispersing, i.e. deflocculating or suspending, properties as distinct from wetting properties, although these substances may also possess wetting properties.

The dispersing agent used may be protective colloid such as gelatin, glue, casein, gums or a synthetic polymeric material such as polyvinyl alcohol. Preferably, however, the dispersing agents used are sodium or calcium salts of high molecular weight sulphonic acids, e.g. the sodium or calcium salts of lignin sulphonic acids derived from sulphite cellulose waste liquors. The calcium or sodium salts of condensed aryl sulphonic acids, for example the product known as "Tamol 731," are also suitable.

The dispersing agents used may be non-ionic emulsifiers, for example the condensation products of fatty acids containing at least 12, preferably 16 to 20, carbon atoms in the molecule, or of abietic acid or naphthenic acids obtained in the refining of petroleum lubricating oil fractions, with alkylene oxides such as ethylene oxide or propylene oxide or with both ethylene oxide and propylene oxide as, for example, the condensation product of oleic acid and ethylene oxide containing 6 ethylene oxide units in the molecule. Partial esters of the above acids with polyhydric alcohols such as glycerol, polyglycerol, sorbitol or mannitol may also be used.

The dispersing agents referred to above may also possess wetting properties but in general it is preferable to incorporate two separate surface active agents, one having particularly good dispersing properties and the other having particularly good wetting properties. The actual amount of wetting agent incorporated can be varied considerably and in general is from 0 to 10% by weight based on the total composition.

Suitable wetting agents include the alkali metal salts, preferably sodium salts, of sulphuric acid esters or sulphonic acids containing at least 10 carbon atoms in the molecule, for example, the sodium secondary alkyl sulphates available under the registered trademark "Teepol," sodium salts of sulphonated castor oil, sodium dodecyl benzene sulphonate. Non-ionic wetting agents may also be employed for example, polyalkylene oxide polymers, e.g. the "Pluronics," and condensation products of polyalkylene oxides with aromatic nuclei (e.g. octyl cresol).

Granulated or pelleted compositions comprising a suitable carrier having a benzamidine incorporated therewith are also included in the invention. These may be prepared by impregnating a granular carrier with a solution of the benzamidine or by granualting a mixture of a finely divided solid carrier and the benzamidine. The carrier used may consist of or contain a fertilizer or fertilizer mixture, for example superphosphate.

The compositions of the invention may also be formulated as solutions of benzamidine in an organic solvent or mixture of solvents, for example of alcohols, ketones especially acetone, ethers, hydrocarbons. Dimethylformamide (DMF) or mixtures of dimethylformamide and methanol. Petroleum hydrocarbon fractions used as solvents should preferably have a flash point above 73° F., for example, a refined aromatic extract of kerosine. Auxiliary solvents such as alcohols, ketones and polyalkylene glycol ethers and esters may be used in conjunction with these petroleum solvents. Such oil solutions are particularly suitable for application by low volume spraying for example at the rate of 5 to 10 gallons per acre. They may also be diluted with a cheap solvent for high volume spraying.

Compositions of the present invention may also be formulated as emulsifiable concentrates which are concentrated solutions or dispersions of the benzamidine in an organic liquid, preferably a water-insoluble organic liquid, containing an added emulsifying agent. These concentrates may also contain a proportion of water for example up to 50% by volume, based on the total composition (i.e. a "mayonnaise" composition) to facilitate subsequent dilution with water. Suitable organic liquids are for example the above petroleum hydrocarbon fractions as described above.

The emulsifying agent may be of the type producing water-in-oil type emulsions which are suitable for application by low volume spraying, or an emulsifier of the type producing oil-in-water emulsions may be used, producing concentrates which can be diluted with relatively large volumes of water for application by high volume spraying. In such emulsions, the benzamidine is preferably in the non-aqueous phate.

Suitable types of emulsifier for use in these emulsions or emulsifiable concentrates are the non-ionic and anionic dispersing and wetting agents described above, also suitable are long chain alkyl ammonium salts and alkyl sulpho-succinates.

The concentration of emulsifier used will in general be within the limits 0.5% and 25.0% based on the final composition.

The compositions of the invention may contain other ingredients, for example, water conditioning agents for example, sodium polyphosphates or cellulose ethers, other herbicides, pesticides or stickers, for example a non-volatile oil.

Aqueous dispersions and emulsions, for example, compositions obtained by diluting the wettable powwers or emulsifiable concentrates of the present invention with water also lie within the scope of the present invention.

We claim as our invention:
1. A compound selected from the group consisting of a compound of the structure

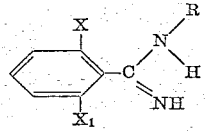

wherein $X$ and $X_1$ each independently represents a middle halogen atom, and where $R$ is selected from the group consisting of hydrogen and phenyl, and the hydrochloric, hydrobromic, nitric, sulfuric and phosphoric acid addition salts of said compound.
2. 2,6-dichlorobenzamidine.
3. N-phenyl-2,6-dichlorobenzamidine.
4. 2,6-dichlorobenzamidine hydrochloride.
5. N-phenyl-2,6-dichlorobenzamidine hydrochloride.

References Cited by the Examiner
UNITED STATES PATENTS

| | | | |
|---|---|---|---|
| 2,375,611 | 5/45 | Barber et al. | 260—564 |
| 2,450,386 | 9/48 | Short et al. | 260—564 |
| 2,517,468 | 8/50 | Djerassi et al. | 260—564 |
| 2,613,225 | 10/52 | Miescher et al. | 260—564 |
| 2,927,014 | 3/60 | Goyette | 71—2.3 |
| 3,020,142 | 2/62 | Willard et al. | 71—2.3 |

FOREIGN PATENTS
614,032  12/48  Great Britain.

OTHER REFERENCES
Oxley et al.: J. Chem. Soc. (London), vol. of 1946, pp. 763–771.

Oxley et al.: J. Chem. Soc. (London), vol. of 1947, pp. 1110–1116.

Oxley et al.: J. Chem. Soc. (London), vol. of 1949, pp. 449–456.

Shah et al.: J. Chem. Soc. (London), vol. of 1932, pp. 642–650.

CHARLES B. PARKER, *Primary Examiner.*